L. S. LACHMAN.
METAL SPOKE WHEEL AND METHOD OF MAKING THE SAME.
APPLICATION FILED JUNE 3, 1919.
1,355,234.  Patented Oct. 12, 1920.
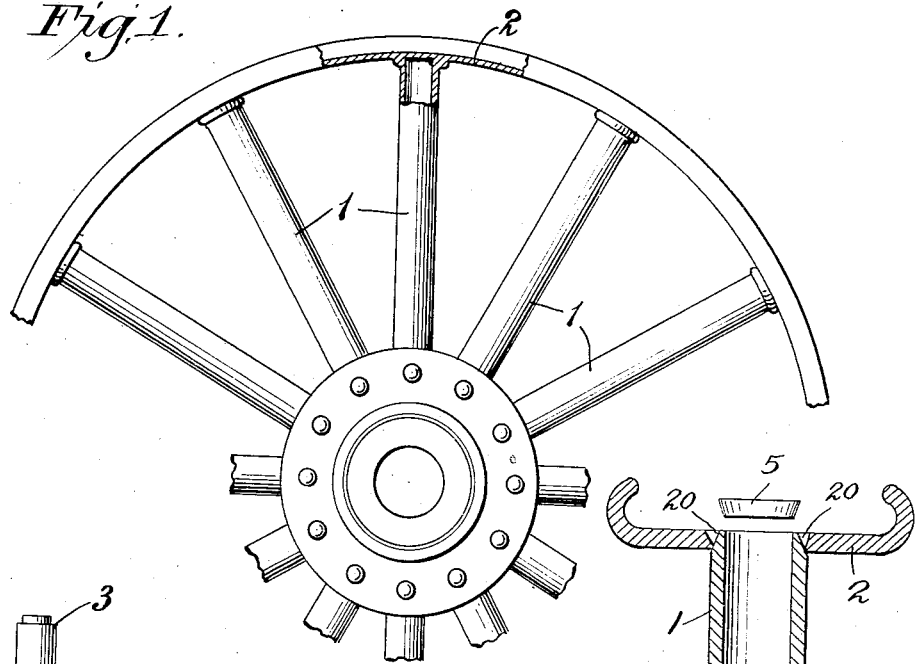
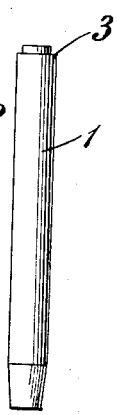
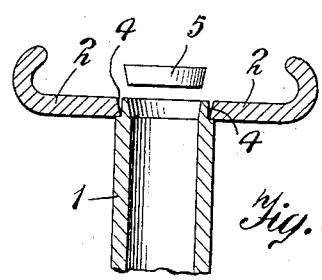
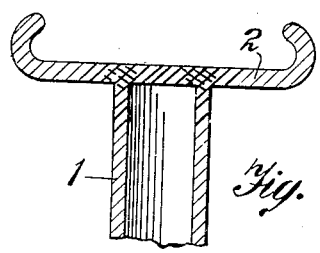
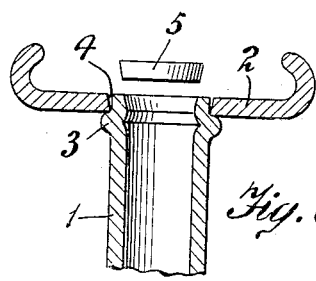
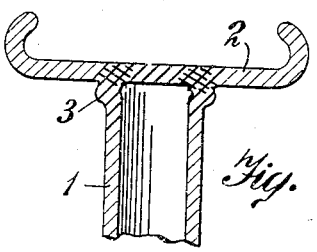
INVENTOR
Laurence S. Lachman
BY
Townsend & Decker
ATTORNEYS

UNITED STATES PATENT OFFICE.

LAURENCE S. LACHMAN, OF NEW YORK, N. Y., ASSIGNOR, BY MESNE ASSIGNMENTS, TO BETHLEHEM STEEL COMPANY, OF BETHLEHEM, PENNSYLVANIA, A CORPORATION OF PENNSYLVANIA.

METAL-SPOKE WHEEL AND METHOD OF MAKING THE SAME.

1,355,234.  Specification of Letters Patent.  Patented Oct. 12, 1920.

Application filed June 3, 1919. Serial No. 301,460.

*To all whom it may concern:*

Be it known that I, LAURENCE S. LACHMAN, a citizen of the United States, and a resident of New York, in the county of New York and State of New York, have invented certain new and useful Improvements in Metal-Spoke Wheels and Methods of Making the Same, of which the following is a specification.

My invention relates to the method of manufacturing metal wheels and more particularly has to do with the method of securing a hollow metal spoke to another member of the wheel, as for instance the felly.

The object of the invention is to produce a strong and durable union and by a method which may be cheaply and readily practised.

The invention consists essentially in inserting the end of the spoke in a tapered aperture or perforation in the complementary member, as for instance the felly, applying a tapered plug in the end of the hollow spoke, forcing the same into the end of the spoke to spread and wedge the end of the spoke against the tapered walls of the aperture or opening and welding the plug in place.

The invention further consists in the novel union of a hollow spoke with the rim or other complementary member of a wheel comprising a tapered plug welded in the spread end of the hollow spoke seated in the tapered opening in the felly and provided with a shoulder engaged with said felly around the opening.

The invention further consists in the novel union of hollow spoke and felly or other member, comprising a tapered plug and a spoke end seated in a tapered opening in the felly and welded to said opening and to a plug inserted in the hollow end of the spoke and by which said end is spread or wedged in the opening.

In the accompanying drawings:

Figure 1 is an elevation showing part of a wheel to the manufacture of which my invention has been applied.

Fig. 2 shows one of the spokes as prepared for fastening it in the rim.

Fig. 3 shows the spoke as assembled with relation to the rim and the fastening plug preparatory to the operation of spreading the spoke end and welding the plug.

Fig. 4 shows the finished joint.

Figs. 5, 6 and 7 illustrate a modification in the manner of preparing the end of the spoke.

Fig. 8 illustrates another modification.

1 indicates the hollow spoke and 2 the complementary member,—in this case consisting of the rim. In Fig. 1 the elements are shown as they are arranged relatively to one another in the finished wheel, it being understood that in the manufacture of the wheel the spokes 1 may be welded in place in the part 2 constituting the rim when the latter part is straight and that the part 2 may be subsequently bent to the form of the rim, thereby causing the free ends of the spokes to converge in the hub part.

The process of uniting the parts, however, may be conducted after the part 2 has been bent to the form of the rim.

The hub part of the wheel Fig. 1 is shown of conventional form but as will be obvious my invention might be likewise applied to uniting the spokes with the hub shell. In Fig. 2 the spoke 1 is shown provided with a shoulder 3 near its end which may be provided by reducing the ends in any desired way. The rim or other member 2 is provided, as shown in Fig. 3, with a perforation or aperture the walls of which are tapered as indicated at 4, the aperture being of sufficient size to receive the reduced end of the spoke and allow the shoulder 3 to seat against the rim or other member 2 preparatory to the operation of uniting the parts. Instead of providing a sharp shoulder 3, the end of the spoke may be tapered as indicated at 20 in Fig. 8.

5 indicates a plug whose taper conforms substantially to the taper of the aperture and which is adapted for insertion at its smaller end into the end of the hollow spoke. The parts having been assembled as indicated in Fig. 3 and with the end of the plug in position in the end of the spoke 1, pressure is applied to the plug to wedge or force the end of the spoke outward and cause its outer walls to seat against the tapered wall 4 and a welding of the parts together is effected during such operation or at any desired stage by heating them to suitable plasticity to cause the plug to be welded in place in the end of the spoke and to cause the spread end of the spoke to be welded against the walls of the opening. Inasmuch as pressure is required to cause the plug 5 to act, the operation may be conveniently conducted in an electric welding machine by which heating current is applied simultaneously with the pressure.

The result of the operation is the formation of a practically homogeneous union of the rim, the spreader plug and the end of the spoke, substantially as indicated in the cross-section Fig. 4.

Instead of reducing the end of the spoke indicated in Fig. 2, a collar or enlargement 3 may be provided near the end thereof, as shown in Fig. 5, thus providing a shoulder which will seat against the rim or other member as indicated in Fig. 6 during the operation of forcing the spreader plug into place. Said shoulder will also assist in securely anchoring the parts together after the uniting operation has been completed. The result of the operation is shown in Fig. 7.

I do not limit myself to any particular manner of effecting the welding since the surfaces or portions of the parts to be welded may be heated by any desired means preparatory to forcing them together to form the weld. As before stated, however, the welding may be more conveniently effected by the electric heating involving the passage of a heavy electric current simultaneously with the pressure.

The collar 3 in Fig. 5 may be conveniently produced by an upsetting operation conducted by heating a section of the spoke electrically at the location of the collar and then applying end pressure to upset the metal after the manner employed in electric forging operations.

What I claim as my invention is:—

1. The herein described process of connecting a hollow spoke with the complementary member of a wheel, consisting in providing the complementary member with a tapered opening or aperture adapted to receive the end of the spoke, applying a tapered plug to the end of the hollow spoke and uniting the parts by heating and by pressure applied to the plug to force it into the end of the spoke and spread the same against the tapered sides of the aperture.

2. The herein described process of connecting a hollow spoke to the rim of a wheel, consisting in providing the spoke with a shoulder at its end, providing the rim with an aperture or perforation adapted to receive the end of the spoke and having a tapered wall or side and uniting the parts in a homogeneous joint by forcing a tapered plug into the open end of the spoke, said plug being of a size adapted to spread the end thereof against the tapered sides of the aperture and uniting the parts in a homogeneous union by heating to welding temperature and by the pressure applied to the plug.

3. A wheel structure having a hollow spoke provided with a shoulder engaging a complementary member of the wheel around a spoke receiving tapered socket or opening therein and a tapered plug integrally secured in the spread end of the hollow spoke.

4. In a wheel structure having a hollow spoke, a union of said spoke with its complementary socketed member comprising a tapered plug and a spread spoke end seated in a tapered opening in said member and integrally secured to the sides of said opening and to the sides of the tapered plug inserted in the spoke end.

Signed at New York, in the county of New York and State of New York, this 29th day of May, A. D. 1919.

LAURENCE S. LACHMAN.

Witnesses:
F. B. TOWNSEND,
IRENE LEFKOWITZ.